United States Patent Office 3,107,294
Patented Oct. 15, 1963

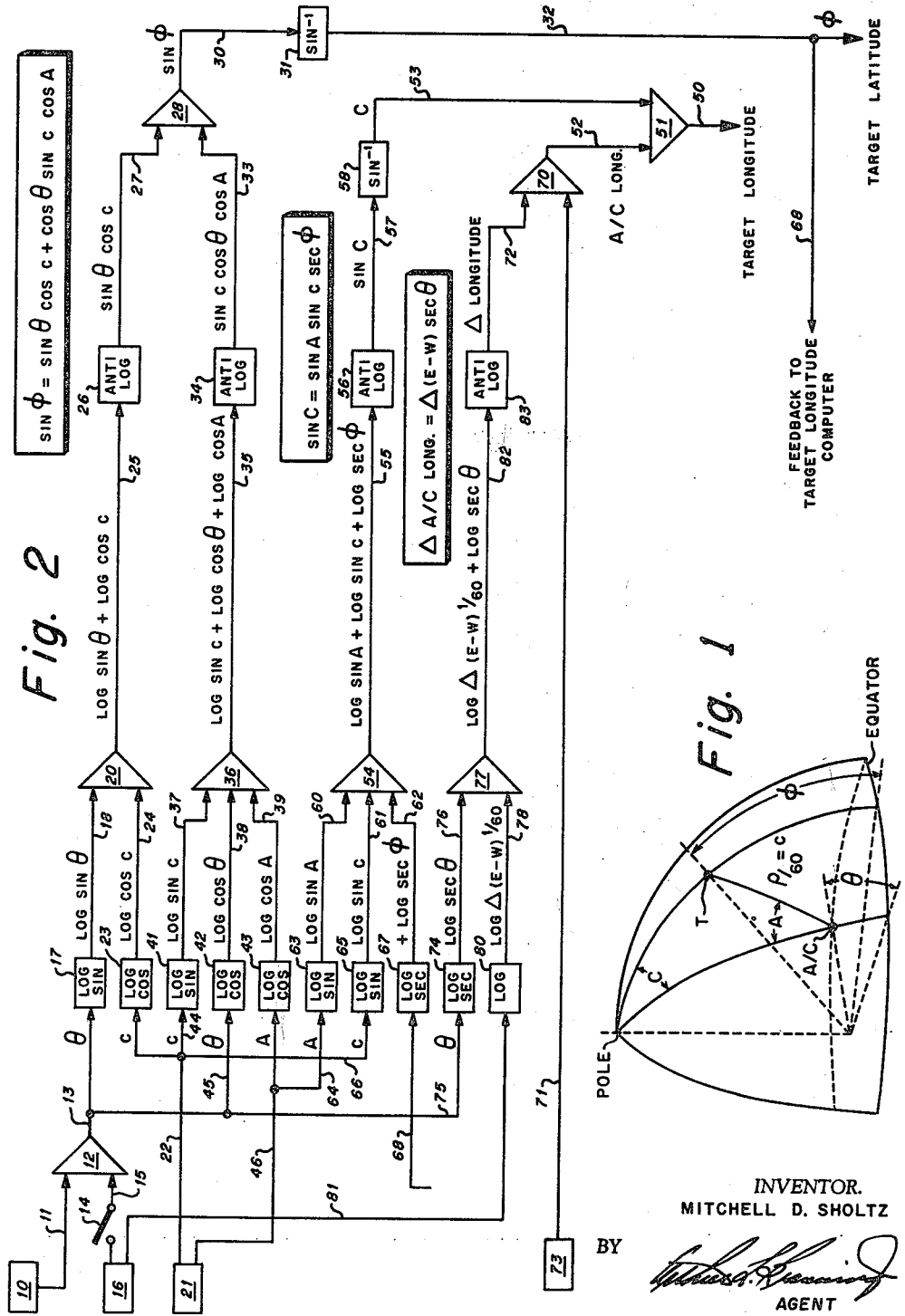

3,107,294
SPHERICAL COORDINATE TARGET POSITION COMPUTER
Mitchell D. Sholtz, Phoenixville, Pa., assignor to the United States of America as represented by the Secretary of the Navy
Filed May 27, 1960, Ser. No. 32,494
3 Claims. (Cl. 235—187)
(Granted under Title 35, U.S. Code (1952), sec. 266)

The invention herein described may be manufactured and used by or for the Government of the United States of America for governmental purposes without the payment of any royalties thereon or therefor.

This invention relates to dead reckoning computers, and more particularly relates to a computer for computing the longitude-latitude of an object.

This invention is directed to the solution of a dead reckoning problem involving the determination of the longitude-latitude position of a target or object where the target's bearing and range from a marker is known and the longitude-latitude position of the marker is known. This invention is especially suitable for use in an aircraft equipped with a longitude-latitude position computer and recorder and a radar unit for providing target range and bearing information.

An object of this invention, therefore, is the provision of a novel computer which will solve the problem referred to hereinabove.

Another object of the invention is the provision of a novel electrical computer having a minimum of moving parts.

A still further object of the invention is the provision of a novel computer which will provide information indicating the longitude-latitude position of the target, referred to hereinabove, without necessity for any further computation.

Yet another object of the invention is the provision of a novel computer, as set forth in the preceding paragraphs, which computer will continuously compute the instantaneous longitude-latitude position of the target.

Another object of this invention is the provision of a novel computer, as set forth hereinabove, capable of simultaneously and continuously solving Equation 1, $\sin \phi = \sin \theta \cos c + \cos \theta \sin c \cos A$; Equation 2, $\sin C = \sin A \sin c \sin \phi$; and Equation 3, $\Delta$ aircraft longitude=$\Delta$E-W/60 miles sec $\theta$; where $\phi$ is the unknown latitude of the target; $\theta$ is the aircraft's own latitude, $c$ is the range from the aircraft to the target in nautical miles divided by sixty minutes which results in the range being given in terms of degrees great circle arc, A is the bearing angle of the target relative to the aircraft referenced to a stabilized or true North, C is the longitude difference between the target and aircraft, $\Delta A/C$ longitude is the change in the aircraft's longitude from a known marker or point, and is the change in East-West nautical miles divided by sixty minutes of arc so as to provide the term in degrees of arc from the earth's equator.

A still further object of the invention is the provision of a novel electrical computer, as set forth in the preceding paragraph, consisting of relatively simple electrical components such as resistors, diodes, saturable core reactors or summing amplifiers, and the like.

The invention further resides in certain novel features of construction, combinations and arrangements of parts, and further objects and advantages of the invention will be apparent to those skilled in the art to which it pertains from the following description of the preferred embodiment thereof described with reference to the accompanying drawings, which form a part of the specification, and wherein the same reference characters represent corresponding parts throughout the several views, and in which:

FIG. 1 is a schematic diagram illustrating a spherical navigation problem;

FIG. 2 is a schematic electromechanical diagram of a spherical coordinate target position computer embodying the invention;

Figure 3:
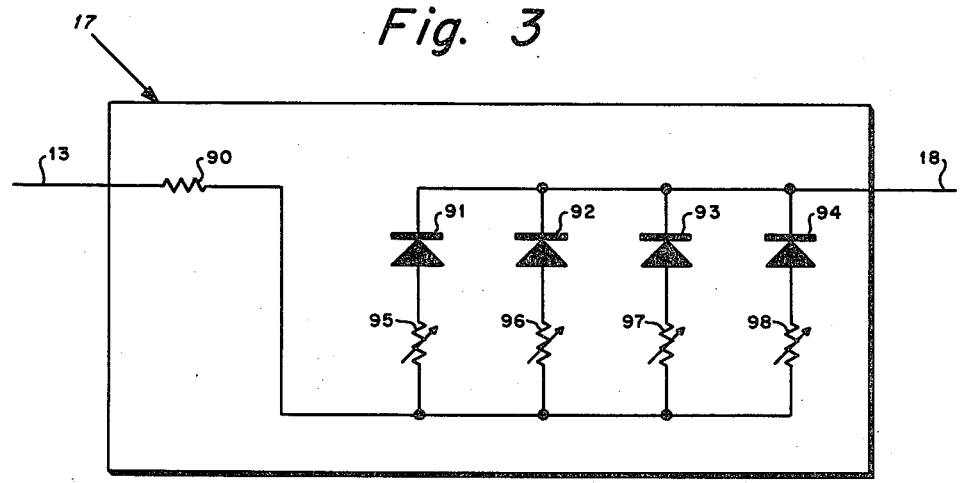
FIG. 3 is an electrical circuit portraying a shaping network.

It is to be understood that the invention is not limited to the details of construction and arrangement of parts shown in the drawings and hereinafter described in detail but is capable of being otherwise embodied and of being practiced or carried out in various ways. It is to be further understood that the phraseology or terminology employed herein is for the purpose of description and there is no intention to herein limit the invention beyond the requirements of the prior art.

This invention comprises a spherical coordinate target position analog computer, FIG. 2, for continuously providing the longitude-latitude position T, FIG. 1, of a target or other object from an aircraft A/C having a known longitude and latitude $\theta$. The longitude and latitude of the aircraft can be provided by conventional apparatus. Also, conventional radar apparatus is preferably used to measure the range and bearing A from the aircraft to the target. The range $p$ is provided in nautical miles divided by sixty minutes of arc which represents degrees of great circle arc and is referred to as range $c$ hereinafter. The bearing A is the bearing angle of the target relative to the aircraft from a stabilized North, which is preferably true North since magnetic deviation varies from point to point on earth.

The difference in longitude between the target and the aircraft is designated as C, FIG. 1, and $\phi$ is the unknown latitude of the target.

Referring to FIG. 2, the computer embodying the invention simultaneously and continuously solves the following three equations:

(1)   $\sin \phi = \sin \theta \cos c + \cos \theta \sin c \cos A$
(2)   $\sin C = \sin A \sin c \sin \phi$ and (3)   $\Delta A/C$ longitude=$\Delta$(E-W) miles$\times$sec $\theta$/60 where:

$\phi$=target latitude
$\theta$=aircraft latitude
$c=p/60$ degrees great circle arc
A=target bearing angle relative to aircraft measured from stabilized North
C=longitude difference from aircraft to target
$\Delta A/C$ longitude=longitude difference from aircraft to a known point
$\Delta$(E-W) miles/60= change in East-West nautical miles divided by minutes of arc to give degrees of arc referenced to the equator Referring to FIG. 2, an electrical voltage signal proportional to the target latitude $\phi$ is obtained in the following manner.

The computer, FIG. 2, has a potentiometer unit 10 for permitting an electrical voltage signal to be inserted therein proportional to the latitude of a known point that the aircraft A/C is currently over. It is preferable that the unit 10 be adjusted before the aircraft takes off from its base which usually has a known latitude. This signal is fed via a line 11 to a saturable reactor 12, which provides a voltage output proportional to the instantaneous aircraft latitude $\theta$ in a line 13. When the aircraft flies over the known point or base, closure of a switch 14 in a line 15 permits the feeding of a voltage therethrough to the saturable reactor 12 from a conventional navigation computer unit 16. The unit 16 provides a signal proportional to change in latitude $\theta$ of the aircraft. This signal is easily provided since sixty nautical miles in the North-South direction is equivalent to one degree of latitude change. The saturable reactor 12 functions as a summing amplifier and accordingly, the sum of the signals from the units 10 and 16 are fed to line 13.

The instantaneous value of the aircraft's latitude $\theta$ is fed via line 13 into a log sin shaping network unit 17, which provides a voltage signal output in a line 18 proportional to log sin $\theta$. The log sin $\theta$ signal is fed to the input of a saturable reactor 20 via the line 18.

When a target is picked up, preferably by a radar unit 21, a voltage signal $c$ proportional to the target range from the aircraft is supplied by the radar unit 21 proportional to difference in degrees of great circle arc between the target and the aircraft. This signal $c$ is fed via a line 22 to a log cos shaping network unit 23 having a voltage signal output proportional to log cos $c$ in a line 24. The line 24 conducts this signal to the input side of the reactor 20. The output signal of the reactor 20 is a voltage proportional to the sum of the log sin $\theta$ signal and the log cos $c$ signal, which sum is fed via a line 25, an anti-log shaping network unit 26, and a line 27 into a saturable reactor 28. The unit 26 has an output signal voltage proportional to sin $\theta$ cos $c$ which is one of the terms of the trigonometric Equation 1.

If the value of the term sin $c$ cos $\theta$ cos $A$ be zero, which will occur when angle A is ninety degrees and the target is due East or due West of the aircraft. The signal output of the reactor 28 then will be a voltage proportional to sin $\theta$. The sin $\phi$ signal is fed via a line 30 into an arc sin shaping network unit 31 having a signal voltage output proportional to the instantaneous latitude $\phi$ position of the target in a line 32. If desired, this signal can be used to drive a readout counter and/or otherwise suitably applied.

It is understood that although saturable reactors are preferably used in this computer, conventional summing amplifiers may be substituted therefor.

A voltage signal proportional to the term sin $c$ cos $\theta$ cos $A$ is fed into the reactor 28 via a line 33 from an anti-log shaping network unit 34. A voltage signal proportional to log sin $c$ + log cos $\theta$ + log cos $A$ is fed via a line 35 from a saturable reactor 36. The reactor 36 has three voltage signal inputs via lines 37, 38, 39, respectively proportional to log sin $c$, log cos $\theta$, and log cos $A$ from a log sin shaping network unit 41 and log cos shaping network units 42 and 43. The unit 41 has a signal input $c$ via a branch line 44 of the line 22. The unit 42 has a signal input $\theta$ via a branch line 45 of line 13. The unit 43 has a voltage signal input proportional to the bearing angle A, FIG. 1, via a line 46 from the radar unit 21.

The longitude position of the target T, FIG. 1, is provided in the form of a voltage signal proportional thereto in an output line 50, FIG. 2, from a saturable reactor 51 of the computer that adds an instantaneous longitude voltage signal and the computed longitude difference between the target T and aircraft voltage signal C supplied in lines 52 and 53, respectively.

The voltage signal C in line 53 is supplied from a saturable reactor 54 via a line 55, an anti-log shaping network unit 56, a line 57, and an arc sin shaping network unit 58, respectively. The output of the reactor 54 sums three input voltage signals proportional to log sin $A$, log sin $c$ and log sec $\theta$ conducted via lines 60, 61 and 62, respectively.

The log sin $A$ signal is provided in the line 60 by a log sin shaping network unit 63 having a voltage signal input proportional to the instantaneous value of A via a branch line 64 of the line 46 leading from the radar unit 21.

The log sin $c$ signal is provided in the line 61 by a log sin shaping network unit 65 having a voltage signal input proportional to the instantaneous value of $c$ via a branch line 66 of lines 22 and 44 leading from the radar unit 21.

The log sec $\phi$ voltage signal in the line 62 is provided by a log sec shaping network unit 67 having an input voltage signal proportional to $\phi$ picked off from the line 32 and conducted to the unit 67 via a line 68.

The voltage signal proportional to the instantaneous aircraft longitude position is provided in the line 52 by means of a saturable reactor 70. The reactor 70 sums input signals proportional to the longitude taken from a known point and the computed change of longitude of the aircraft from the known point via lines 71 and 72, respectively. The voltage signal in the line 71 is provided by adjusting a wiper on a potentiometer in a unit 73 while the aircraft is at or over the point of known longitude.

Equation 3 is solved by simultaneously supplying a voltage signal $\theta$ to a log sec shaping network 74 via a branch line 75 from the line 13 and feeding log sec $\theta$ a signal via a line 76 to a saturable reactor 77.

The reactor 77 sums the log sec $\theta$ signal with a log $\Delta(E-W)/60$ miles supplied thereto via a line 78 from a log shaping network unit 80. The unit 80 has an input signal fed thereto via a line 81 from the navigation computer 16. The signal in the line 81 is proportional to the degrees of arc traveled by the aircraft in an East-West direction referenced to the earth's equator.

The output of the reactor 77 is fed to the reactor 70 via a line 82, an anti-log shaping network unit 83 and the line 72.

Figure 4:
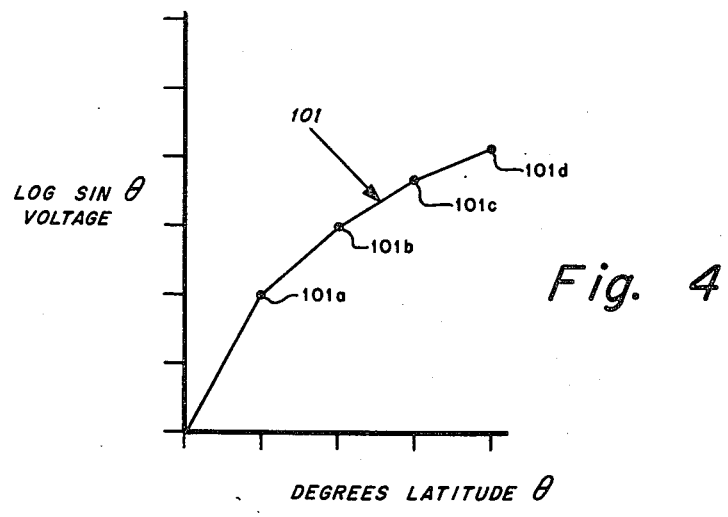
FIG. 4 is a graphical representation of a curve of log sin $\theta$ voltage vs. degrees latitude $\theta$, used to select a voltage value proportional to a trigonometric function of an angle.

Each of the shaping network units is comprised of a network of resistances and diodes combined in an electrical circuit, FIG. 3, in such a manner that for a given input voltage signal the desired output voltage signal is obtained, FIG. 4 For example, the log sin shaping network unit 17 is comprised of a main line resistor 90 and a plurality of diodes 91, 92, 93, 94 electrically connected in parallel. Each of the diodes 91, 92, 93, 94 is preferably a Zener diode since they are made available with known breakdown ratings ranging from 0.3 to 300 volts. Additionally, resistors such as variable resistors 95, 96, 97, 98 are respectively coupled in series with and preceding the diodes 91, 92, 93, 94 so that the breakdown current can be closely regulated for the purpose of providing a curve 101, FIG. 4, where a voltage signal $\theta$ proportional to degrees latitude of the aircraft is shaped to be proportional to log sin $\theta$. More particularly, when the diode 91 breaks down and conducts, point 101a can be plotted, when the diodes 91 and 92 are conducting, point 101b is plotted. Similarly, point 101c is plotted when diodes 91, 92, 93 are conducting. Point 101d is plotted when the diodes 91, 92, 93, 94 are conducting.

It is understood that as many resistances and diodes can be used as are desired or required.

It is the intention to hereby cover not only the above mentioned modification of the preferred construction, but it is the intention to cover all adaptations, modifications, and uses thereof which come within the practice of those skilled in the art to which the invention relates, and the scope of the appended claims.

What is claimed is:

1. An analog computer for providing voltage signals in an aircraft proportional to the longitude and latitude of a target, comprising; means for generating a signal θ proportional to the latitude of the aircraft, means for generating a signal c proportional to the range of the target relative to the aircraft in terms of degrees of great circle arc, means for generating a signal A proportional to the bearing angle of the target from the aircraft from a stabilized North, signal shaping network means connected to said signal θ generating means for providing a signal proportional to the log sin of said signal θ, signal shaping network means connected to said signal c generating means providing a signal proportional to the log cos of said signal c, first summing means electrically connected to said log sin and said log cos shaping network means for summing said log sin θ signal and said log cos c signal, first anti-log signal shaping network means connected to said first summing means for providing a signal proportional to sin θ cos c, signal shaping network means electrically connected to said signal c generating means for providing a signal proportional to the log sin of said signal c, signal shaping network means electrically connected to said signal θ generating means for providing a signal proportional to the log cos of said signal θ, shaping network means connected to said signal A generating means for providing a signal proportional to the log cos of said signal A, second summing means connected to said log sin c and said log cos θ and said log cos A shaping network means for summing said log sin c and said log cos θ and said log cos A signals, second anti-log signal shaping network means connected to said second summing means, third summing means connected to said first and second anti-log shaping network means for providing a signal proportional to sin φ, first arc sin signal shaping network means connected to said third summing means for providing a signal proportional to the latitude φ of the target, signal shaping network means connected to said signal A generating means for providing a signal proportional to the log sin of said signal A, signal shaping network means connected to said signal c generating means for providing a signal proportional to the log sin of said signal c, signal shaping network means connected to said first arc sin signal shaping network means for providing a signal proportional to the log sec of said signal φ, fourth summing means connected to said log sin A and said log sin c and said log sec φ signal shaping network means, third anti-log signal shaping network means connected to said fourth summing means for providing a signal proportional to the sin of said signal c, second arc sin shaping network means connected to said fourth summing means for providing a signal C proportional to the degrees longitude difference between the target and the aircraft, signal shaping network means connected to said signal θ generating means for providing a signal proportional to the log sec of said signal θ, means generating a signal proportional to the degrees of aircraft longitude change Δ(E-W)/60 referenced to the earth's equator, signal shaping network means connected to said Δ(E-W)/60 signal generating means for providing a signal proportional to the log of said signal Δ(E-W)/60, fifth summing means connected to said log sec θ and log Δ(E-W)/60 signal shaping network means, fourth anti-log signal shaping network means connected to said fifth summing means for providing a signal proportional to the degrees of aircraft longitude change from a point of known longitude, means for generating a signal $l$ proportional to the longitude of said known point, and sixth summing means connected to said fourth anti-log signal shaping network means and said signal $l$ generating means for providing a signal L proportional to the longitude of the aircraft, and seventh summing means connected to said sixth summing means and said second arc sin signal shaping network means for providing a signal proportional to the longitude of the target.

2. In an analog computer for providing a voltage signal in an aircraft proportional to the latitude of a target, means for generating a signal θ proportional to the latitude of the aircraft, means for generating a signal c proportional to the range of the target relative to the aircraft in terms of degrees of great circle arc, means for generating a signal A proportional to the bearing angle of the target from the aircraft from a stabilized North, signal shaping network means connected to said signal θ generating means for providing a signal proportional to the log sin of said signal θ, signal shaping network means connected to said signal c generating means providing a signal proportional to the log cos of said signal c, first summing means electrically connected to said log sin and log cos shaping network means for summing said log sin θ signal and said log cos c signal, first anti-log signal shaping network means connected to said first summing means for providing a signal proportional to sin θ cos c, signal shaping network means electrically connected to said signal c generating means for providing a signal proportional to the log sin of said signal c, shaping network means electrically connected to said signal θ generating means for providing a signal proportional to the log cos of said signal θ, shaping network means connected to said signal A generating means for providing a signal proportional to the log cos of said signal A, second summing means connected to said log sin c and said log cos θ and said log cos A shaping network means for summing said log sin c and said log cos θ and said log cos A signal, second anti-log signal shaping network means connected to said second summing means, third summing means connected to said first and second anti-log shaping network means for providing a signal proportional to sin φ, and first arc sin signal shaping network means connected to said third summing means for providing a signal proportional to the latitude φ of the target.

3. In an analog computer for providing a voltage signal in an aircraft proportional to the longitude of a target, means for generating a signal θ proportional to the latitude of the aircraft, means for generating a signal c proportional to the range of the target relative to the aircraft in terms of degrees of great circle arc, means for generating a signal A proportional to the bearing angle of the target from the aircraft from a stabilized North, means generating a signal proportional to a latitude φ of the target, signal shaping network means connected to said signal A generating means for providing a signal proportional to the log sin of said signal A, signal shaping network means connected to said signal c generating means for providing a signal proportional to the log sin of said signal c, signal shaping network means connected to said signal φ generating means for providing a signal proportional to the log sec of said signal φ, first summing means connected to said log sin A and said log sin c and said log sec φ signal shaping network means, first anti-log signal shaping network means connected to said first summing means for providing a signal proportional to the sin of said signal c, arc sin shaping network means connected to said first anti-log signal shaping network means for providing a signal C proportional to the degrees longitude difference between the target and the aircraft, signal shaping network means connected to said signal θ generating means for providing a signal proportional to the log sec of said signal θ, means generating a signal proportional to the degrees of aircraft longitude change Δ(E-W)/60 referenced to the earth's equator, signal shaping network means connected to said signal generating means for providing a signal proportional to the log of said Δ(E-W)/60 signal, second summing means connected to said log sec θ and log Δ(E-W)/60 signal shaping network means for summing said log sec θ signal and said log Δ(E-W)/60 signal, second anti-log signal shaping network means connected to said second summing means for providing a signal proportional to the degrees of aircraft longitude change from a point of known longitude, means for generating a signal $l$ proportional to the longitude of said known point, and third summing means connected to said second anti-log signal shaping network means and said signal $l$ generating means for providing a signal L proportional to the longitude of the aircraft, and fourth summing means connected to said arc sin signal shaping network means and said third summing means for providing a signal proportional to the longitude of the target.

References Cited in the file of this patent

Reference Data for Radio Engineers (4th edition), July 1957 (International Telephone and Telegraph Corp., New York), pages 1045–46.

Korn et al.: Electronic Analog Computers (2nd edition) (McGraw-Hill, New York), 1956, page 281.